US008460826B2

(12) United States Patent
Huang et al.

(10) Patent No.: US 8,460,826 B2
(45) Date of Patent: Jun. 11, 2013

(54) LITHIUM-IRON DISULFIDE CELL DESIGN

(75) Inventors: Weiwei Huang, Westlake, OH (US); Matthew T. Wendling, Avon, OH (US)

(73) Assignee: Eveready Battery Companym Inc., St. Louis, MO (US)

( * ) Notice: Subject to any disclaimer, the term of this patent is extended or adjusted under 35 U.S.C. 154(b) by 184 days.

(21) Appl. No.: 12/480,015

(22) Filed: Jun. 8, 2009

(65) Prior Publication Data

US 2010/0310910 A1 Dec. 9, 2010

(51) Int. Cl.
*H01M 4/58* (2010.01)

(52) U.S. Cl.
USPC ........ 429/231.95; 429/221; 429/94; 429/337; 429/336; 429/339

(58) Field of Classification Search
USPC .................................... 429/94, 221, 337, 341
See application file for complete search history.

(56) References Cited

U.S. PATENT DOCUMENTS

| | | | |
|---|---|---|---|
| 4,375,815 A | 3/1983 | Burns | |
| 5,290,414 A | 3/1994 | Marple | |
| 6,849,360 B2 | 2/2005 | Marple | |
| 7,157,185 B2 | 1/2007 | Marple | |
| 2005/0079404 A1 | 4/2005 | Schubert et al. | |
| 2005/0112462 A1 | 5/2005 | Marple | |
| 2005/0233214 A1* | 10/2005 | Marple et al. ................. | 429/221 |
| 2005/0244706 A1 | 11/2005 | Wu et al. | |
| 2005/0277023 A1 | 12/2005 | Marple et al. | |
| 2007/0202409 A1 | 8/2007 | Yamakawa et al. | |
| 2007/0275298 A1 | 11/2007 | Igoris et al. | |
| 2008/0026293 A1 | 1/2008 | Marple et al. | |
| 2008/0050654 A1 | 2/2008 | Stevanovic | |
| 2008/0076022 A1 | 3/2008 | Marple | |
| 2008/0213651 A1 | 9/2008 | Wu et al. | |
| 2008/0226982 A1 | 9/2008 | Schubert | |
| 2008/0254343 A1 | 10/2008 | Kaplin et al. | |
| 2009/0061293 A1 | 3/2009 | Webber | |
| 2009/0070989 A1 | 3/2009 | Pozin et al. | |
| 2009/0074953 A1 | 3/2009 | Chang et al. | |
| 2009/0104520 A1* | 4/2009 | Marple ......................... | 429/164 |
| 2009/0148756 A1 | 6/2009 | Specht et al. | |

FOREIGN PATENT DOCUMENTS

| | | | |
|---|---|---|---|
| CN | 1564370 A | | 1/2005 |
| JP | 2006-100164 | * | 4/2006 |
| JP | 2006100164 A | | 4/2006 |
| WO | 2009036029 A1 | | 3/2009 |

OTHER PUBLICATIONS

Patent Cooperation Treaty (PCT), International Search Report and Written Opinion for Application No. PCT/US2010/035380, filed May 19, 2010, mailed Aug. 6, 2010, European Patent Office, Netherlands.

* cited by examiner

*Primary Examiner* — Melvin C Mayes
*Assistant Examiner* — Colette Nguyen
(74) *Attorney, Agent, or Firm* — Eveready Battery Company, Inc

(57) ABSTRACT

A lithium-iron disulfide electrochemical cell design is disclosed, relying on judicious selection of the electrolyte, a thicker lithium anode and a cathode with specific characteristics selected to cooperate with the electrolyte. The resulting cell has a reduced interfacial surface area between the anode and the cathode but, surprisingly, maintains excellent high drain rate capacity.

22 Claims, 1 Drawing Sheet

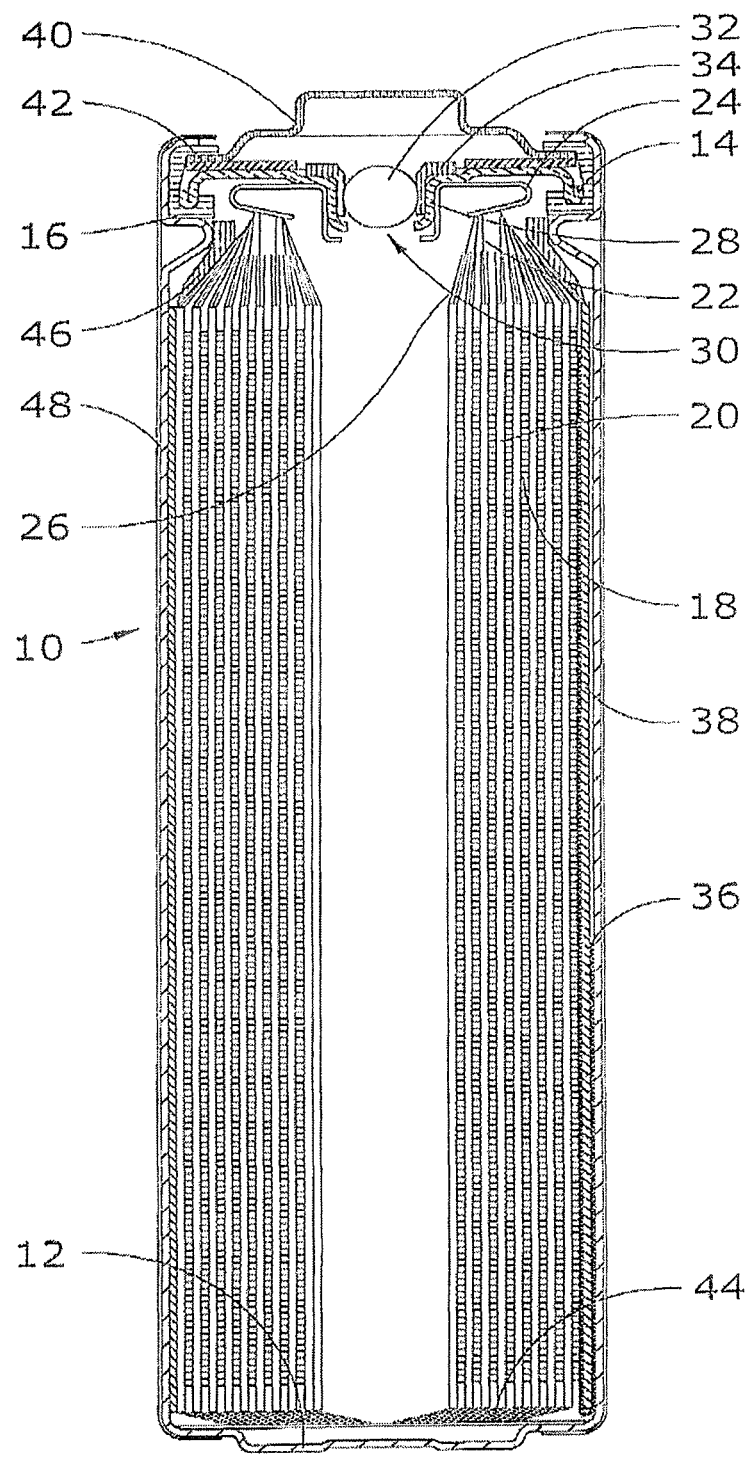

LITHIUM-IRON DISULFIDE CELL DESIGN

FIELD OF INVENTION

The invention relates to primary electrochemical cells having a jellyroll electrode assembly that includes a lithium-based negative electrode, a positive electrode with a coating comprising iron disulfide deposited on a current collector and a polymeric separator. More particularly, the invention relates to a cell design relying on judicious selection of the electrolyte, a thicker lithium anode and a cathode with specific characteristics selected to cooperate with the electrolyte. The resulting cell has a reduced interfacial surface area between the anode and the cathode but, surprisingly, maintains excellent high drain rate capacity.

BACKGROUND

Electrochemical cells are presently the preferred method of providing cost effective portable power for a wide variety of consumer devices. The consumer device market dictates that only a handful of standardized cell sizes (e.g., AA or AAA) and specific nominal voltages (typically 1.5 V) be provided. Moreover, more and more consumer electronic devices, such as digital still cameras, are being designed with relatively high power operating requirements. As has been the practice within the market, consumers often prefer and opt to use primary batteries for their convenience, reliability, sustained shelf life and more economical per unit price as compared to currently available rechargeable (i.e., secondary) batteries.

Within this context, it is readily apparent that design choices for primary (i.e., non-rechargeable) battery manufacturers are extremely limited. For example, the necessity of using specified nominal voltages significantly limits the selection of potential electrochemical materials, and the use of standardized cell sizes restricts the overall available internal volume available for active materials, safety devices and other elements typically expected in such consumer products. What's more, the variety of consumer devices and the range of operating voltages for those devices make smaller nominal voltage cells (which can be provided separately or in series, thereby giving device makers more design options) more versatile as compared to higher voltage electrochemical pairings typically associated with secondary batteries. Thus, 1.5 V systems, such as alkaline or lithium-iron disulfide systems, are far more prominent than others, such as 3.0 V and higher lithium-manganese dioxide.

Within the realm of 1.5 V systems, lithium-iron disulfide batteries (also referred to as LiFeS$_2$, lithium pyrite or lithium iron pyrite) offer higher energy density, especially at high drain rates, as compared to alkaline, carbon zinc or other systems. However, current regulatory limitations on the amount of lithium (the preferred electrochemically active material in the anode) make the FR03 (AAA LiFeS$_2$ cells) and FR6 (AA LiFeS$_2$ cells) sizes the most significant cell sizes for this chemistry within the consumer market.

The design considerations for 1.5V electrochemical systems (e.g., alkaline v. lithium-iron disulfide, etc.) are significantly different. For example, alkaline and nickel oxy-hydroxide systems rely on an aqueous and highly caustic electrolyte that has a propensity for gas expansion and/or leakage, leading to very different approaches in terms of selection of internal materials and/or compatibility with containers and closures. In rechargeable 1.5 V systems (note that lithium-iron disulfide systems are not currently considered suitable for consumer-based rechargeable systems), various highly specialized electrochemical and/or electrolyte compositions may be used to best accommodate lithium ion charge/discharge cycling. Here, such high cost components are not a key design concern because secondary systems typically sell for a higher retail price than their primary battery equivalents. Moreover, the discharge mechanisms, cell designs and safety considerations are, by and large, inconsequential and/or inapplicable to primary systems.

Even with the inherent advantages of lithium-iron disulfide cells for high power devices (as compared to primary alkaline cells), LiFeS$_2$ cell designs must strike a balance between the cost of materials used, the incorporation of necessary safety devices and the overall reliability, delivered capacity and intended use of the designed cell. Normally, low power designs emphasize the quantity of active materials, while high power designs focus more on configurations to enhance discharge efficiency. For example, a jellyroll design maximizes the surface area between the electrodes and allows for greater discharge efficiencies, but in doing so, might sacrifice capacity on low power and low rate discharges because it uses more inactive materials, such as separator and current collector(s) (both which occupy internal volume, thereby requiring removal of active materials from the cell design).

In addition to improved capacity, cell designers must also consider other important characteristics, such as safety and reliability. Safety devices normally include venting mechanisms and thermally activated "shutdown" elements, such as positive thermal circuits (PTCs). Improvements to reliability primarily focus on preventing internal short circuits. In both instances, these characteristics ultimately require elements that occupy internal volume and/or design considerations that are usually counterproductive to cell internal resistance, efficiency and discharge capacity. Moreover, there are additional challenges because transportation regulations limit the percent amount of weight lithium batteries can lose during thermal cycling, meaning that cell designs for smaller container sizes like AA and AAA can only lose milligrams of total cell weight (usually by way of evaporation of the electrolyte). Plus, the reactive and volatile nature of the non-aqueous, organic electrolyte severely limits the universe of potential materials available (particularly with respect to interactions between the electrolyte and cell closure, separator and/or current collector(s) provided within the cell) as compared to other electrochemical systems.

Ultimately, maximizing the amounts of active materials in lithium-iron disulfide batteries while maintaining optimal properties, particularly with respect to the cathode, may be the most difficult challenge. As noted above, the jellyroll electrode assembly is the preferred configuration in LiFeS$_2$ systems. In order to accommodate iron disulfide most effectively, the iron disulfide is mixed into slurry with conductors and binders and then coated onto a metallic foil current collector, while the lithium is most effectively provided without a current collector. Lastly, the separator is a thin polymeric membrane whose thickness is preferably minimized to reduce the inactive inputs into the cell.

Because the reaction end products occupy more volume than the inputs, the electrode assembly swells as the battery discharges. In turn, swelling creates radial forces that can cause unwanted bulging of the cell container, as well as short circuits if the separator is compromised. Previous means of handling these problems include using strong (often thicker) materials for the cell housing and inactive components within the cell. However, thicker inactive materials limit the internal volume available and thicker, more rugged electrodes were previously deemed not necessarily desirable because they allow for fewer winds possible in the jellyroll, resulting in less surface area between the electrodes and the expectation of comparatively lower performance at higher drain rates.

A number of other approaches have been taken to strike an appropriate balance between optimal internal volume utilization and acceptable LiFeS$_2$ cell capacity/performance. For example, a possible solution for problems created by swelling, disclosed in U.S. Pat. No. 4,379,815, is to balance cathode expansion and anode contraction by mixing one or more other active materials (such as CuO, Bi$_2$O$_3$, Pb$_2$Bi$_2$O$_5$, P$_3$O$_4$, CoS$_2$) with pyrite, although these additional materials can negatively affect the discharge characteristics of the cell, and the capacity and efficiency of the overall cell may also suffer.

Other means of improving discharge capacity in LiFeS$_2$ cell contemplate the use of thinner separators and/or specific cathode coating mixes and coating techniques, as disclosed in U.S. Patent Publication Nos. 20050112462 and 20050233214.

U.S. Pat. Nos. 6,849,360 and 7,157,185 discloses the use of a specific cathode coating formulation and an anode provided as pure lithium (or a lithium-aluminum alloy) to obviate the need for an anode current collector. The amount of anode and cathode are then provided at specified ratio of anode to cathode interfacial active materials (i.e., the theoretical interfacial input capacity ratio) in order to enhance LiFeS$_2$ cell high rate performance.

U.S. Patent Publication Nos. 20090074953, 20090070989 and 20080050654 and Chinese Patent Application No. 200410026754.0 all disclose cathodes that may be pertinent to a LiFeS$_2$ cell.

SUMMARY OF INVENTION

Improvements to capacity represent a fundamentally sound battery design. That is, in order to deliver greater capacity, careful consideration must be given for the radial expansion forces and other dynamics at work in a discharging lithium-iron disulfide battery. For example, if the design provides inadequate thickness in the anode or the cathode current collector then the radial forces during discharge may compress the jellyroll to such a degree so as to cause a disconnect in one or both electrodes and, once this disconnect occurs, the battery may cease to deliver capacity regardless of whether the active materials have all been discharged. Similar situations arise with respect to the void volume (in the cathode coating and the interior of the cell as a whole), the electrical connections throughout the battery, the separator, the closure/venting mechanism for the battery and the like. Therefore, the capacity of a LiFeS$_2$ cell is a significant metric for the overall viability and robustness of a cell design, particularly when the cell designer is limited to the use of a standard-sized consumer battery (e.g., AA or FR6; AAA or FR03; etc.)

As a corollary to the capacity acting as a de facto metric for battery design, those skilled in the art will appreciate that design choices, and particularly the selection of specific components, must be made in consideration of the overall battery. A specific composition may have surprising, unexpected or unintended effects upon the other components and compositions within the cell. Similarly, in standard sized batteries, the selection of a particular element occupies volume within the container that might otherwise have been available for other elements. Thus, this interdependency of design choices necessarily means that any increase in capacity, and especially an increase that does not negatively impact the safety or performance of the battery in other regards, is much more than a simple act of adding more active materials.

For example, U.S. Patent Publication 20090104520, incorporated by reference herein, provides a "holistic" approach to cell design for LiFeS$_2$ systems. In particular, this patent publication informs the artisan to select container and cathode formulations in a manner that efficiently accommodates the expected expansion. In so doing, the overall cell experiences increased capacity without any deleterious effects upon safety or reliability.

As noted above, greater electrode interfacial area and more efficient electrodes was expected to yield better performing batteries for high rate tests (e.g., the ANSI digital still camera test, etc.). Thinner electrodes provide greater electrode interfacial surface area, while increased use of conductors, especially within the mix components, are expected to increase electrode efficiency. In turn, both of these design features are expected to increase capacity on high rate tests.

Yet another important consideration for cell designers in LiFeS$_2$ systems relates to minimizing the internal resistance of the cell. Generally speaking, the internal resistance is caused by the components used to make the cell, and can be expressed as follows:

$$R_{cell} = R_{container} + R_{electrode\ assembly}$$

The resistance from the container components ($R_{container}$) includes resistance caused by the can (including external contact terminals), internal electrical connections (e.g., welds or pressure contacts), internal safety devices (e.g., PTC) and the like. Typically, the resistance from these container components will behave in a relatively predictable and easy to control manner, thereby making it relatively simple to minimize this contribution.

However, the resistance caused by the electrode assembly ($R_{electrode\ assembly}$) can be an indicator of the overall quality of the design because this resistance is much more difficult to predict and control. Moreover, in a lithium cell where the anode consists essentially of high conductive lithium or a lithium-based alloy, the resistance of the electrode assembly will depend and vary almost entirely upon the selection of the separator and the cathode. Thus, how and what is coated onto the cathode current collector, in conjunction with selection of an appropriate separator, can be viewed as having a direct, measurable effect on the overall resistance of a cell. Extending this concept one step further, in a series of cells where the components of the container and the separator are essentially identical, the overall resistance of the cell will serve as an excellent proxy of comparison as to the desirability of the cathodes for those cells.

The inventor has now discovered, quite unexpectedly, that for certain types of LiFeS$_2$ cells, it is possible to maintain excellent overall cell performance through the use of a jellyroll having a substantially reduced interfacial surface area between the electrodes (i.e., less than 200 cm$^2$ in an FR6 cell). In particular, such a cell will outperform a cell with larger interfacial surface area on the Digital Still Camera Test (defined below), while essentially maintaining parity on lower rate tests. Additionally, such a cell will experience a significant drop in its internal resistance as compared to a cell with similar container components, electrical connections, separator material and lithium anode. That is, a significant drop in R10 resistance (as defined below) occurs during the Digital Still Camera Test at approximately two-thirds depth of discharge (which is between 175 and 220 minutes on the DSC Test for currently available FR6 cells). The inventor has determined this R10 resistance drop on the DSC Test serves as an excellent indicator for the combination of anode, cathode and electrolyte features described in detail below.

The reduced interfacial surface area and/or improvements on the DSC Test are caused by the use of a thicker-than-normal lithium-alloy anode, a cathode coating with specified pyrite weight percent and loading in combination with a final solids packing. The use of an electrolyte containing a certain amount of ethers is also significant, insofar as it is believed that most ethers possess sufficiently low viscosity to interact with the cathode coating.

In view of the foregoing, one aspect of the invention relates to an electrochemical cell comprising an R6 sized container having a height no greater than about 50.5 mm and a diameter no greater than about 14.5 mm; a jellyroll electrode assembly having less than 200 $cm^2$ of interfacial area between an anode consisting essentially of lithium or lithium-based alloy and a cathode comprising a mix coated onto a metallic foil current collector, wherein the mix has at least 91 wt. % pyrite and a final solids packing between 58% to 70%; and an electrolyte consisting essentially of one or more electrolytic salts dissociated in one or more solvents comprising at least 50 vol. % of one or more ethers based on total volume of the solvents, said one or more solvents not including any carbonate-based solvents.

Another aspect of the invention relates to a lithium-iron disulfide electrochemical cell comprising a container; a jellyroll electrode assembly having a separator with a thickness of 25 microns or less disposed between an anode consisting essentially of lithium or lithium-based alloy with a thickness of at least 200 microns and a cathode comprising a mix coated onto a metallic foil current collector, said mix having a solids packing between 58% to 70% and a loading of at least 28 mg of mix/$cm^2$ on each side of the foil current collector; an electrolyte including at least one lithium-based salt dissociated in one or more solvents having at least 50 vol. % of one or more ethers, based on total volume of the solvents; and wherein the cell experiences a comparative drop of R10 resistance in excess of 20% at about 66% depth of discharge during the Digital Still Camera Test.

Yet another aspect of the invention relates to a lithium-iron disulfide electrochemical cell comprising a container; a jellyroll electrode assembly having: i) a separator with a thickness between 16 and 25 microns, ii) an anode consisting essentially of lithium or lithium-based alloy with a thickness of at least 175 microns, and iii) a cathode comprising a mix with at least 91 wt. % pyrite coated onto a metallic foil current collector, said mix having a final solids packing between 58% to 70% and a loading of at least 24 mg of mix/$cm^2$ on each side of the current collector. An electrolyte comprising one lithium-based salt and one or more solvents consisting of at least 50 vol. % of one or more ethers based on total volume of the solvents is also used.

BRIEF DESCRIPTION OF DRAWINGS

FIG. 1 illustrates one embodiment of a cell design for a lithium-iron disulfide electrochemical cell.

DESCRIPTION OF A PREFERRED EMBODIMENT OF THE INVENTION

Unless otherwise specified, as used herein the terms listed below are defined and used throughout this disclosure as follows:
 ambient temperature or room temperature—between about 20° C. and about 25° C.; unless otherwise stated, all examples, data and other performance and manufacturing information were conducted at ambient temperature;
 anode—the negative electrode; more specifically, in a lithium-iron disulfide cell, it consists essentially of lithium or lithium-based alloy (i.e., an alloy containing at least 90% lithium by weight) as the primary electrochemically active material;
 capacity—the capacity delivered by a single electrode or an entire cell during discharge at a specified set of conditions (e.g., drain rate, temperature, etc.); typically expressed in milliamp-hours (mAh) or milliwatt-hours (mWh) or by the number of images taken under a digital still camera test;
 cathode—the positive electrode; more specifically, in a lithium-iron disulfide cell, it comprises iron disulfide as the primary electrochemically active material, along with one or more rheological, polymeric and/or conductive additives, coated onto a metallic current collector;
 cell housing—the structure that physically encloses the electrode assembly, including all internally enclosed safety devices, inert components and connecting materials which comprise a fully functioning battery; typically these will include a container (formed in the shape of a cup, also referred to as a "can") and a closure (fitting over the opening of the container and normally including venting and sealing mechanisms for impeding electrolyte egress and moisture/atmospheric ingress); depending upon the context may sometimes be used interchangeably with the terms can or container;
 cylindrical cell size—any cell housing having a circular-shaped cylinder with a height that is greater than its diameter; this definition specifically excludes button cells, miniature cells or experimental "hockey puck" cells;
 Digital Still Camera Test (also referred to as the ANSI Digital Still Camera Test)—a camera takes two pictures (images) every minute until the battery life is exhausted, following the testing procedure outlined in ANSI C18.3M, Part 1-2005 published by the American National Standard for Portable Lithium Primary Cells and Batteries—General and Specifications and entitled, "Battery Specification 15LF (AA lithium iron disulfide), Digital camera test". This test consists of discharging a AA sized lithium iron disulfide battery at 1500 mW for 2 seconds followed by 650 mW for 28 second, with this 30 second cycle repeated for a total cycle of 5 minutes (10 cycles) and followed by a rest period (i.e., 0 mW) for 55 minutes. The entire hourly cycle 24 hours per day until a final 1.05 voltage or less is recorded. Each 30 second cycle is intended to represent one digital still camera image.
 electrochemically active material—one or more chemical compounds that are part of the discharge reaction of a cell and contribute to the cell discharge capacity, including impurities and small amounts of other moieties present;
 electrode assembly interfacial area—the total area of the jellyroll electrode assembly wherein the anode, cathode and separator are all aligned so as to allow for an electrochemical reaction (for example, the electrode assembly interfacial height in a cylindrically shaped jellyroll electrode assembly would be determined by the longitudinal axis along all points where the anode, cathode and separator are perpendicularly adjacent to one another on that axis);
 FR6 cell—With reference to International Standard IEC-60086-1 published by the International Electrotechnical Commission on after November 2000, a cylindrical cell size lithium iron disulfide battery with a maximum external height of about 50.5 mm and a maximum external diameter of about 14.5 mm;

FR03 cell—With reference to International Standard IEC-60086-1 published by the International Electrotechnical Commission on after November 2000, a cylindrical cell size lithium iron disulfide battery with a maximum external height of about 44.5 mm and a maximum external diameter of about 10.5 mm;

"jellyroll" (or "spirally wound") electrode assembly—strips of anode and cathode, along with an appropriate polymeric separator, are combined into an assembly by winding along their lengths or widths, e.g., around a mandrel or central core;

loading—with respect to the final dried and densified cathode mix coated to the foil current collector, the amount of specified material found a single facing of a specified area of the current collector, typically expressed as milligrams of total cathode mix (i.e., including pyrite, binders, conductors, additives, etc.) on a single side of a one square centimeter portion of the cathode collector that is interfacially aligned;

nominal—a value, typically specified by the manufacturer, that is representative of what can be expected for that characteristic or property;

pyrite—a mineral form of iron disulfide, typically containing at least 95% electrochemically active iron disulfide when used in batteries;

solids packing—in a coating, but excluding the current collector, the ratio of volume in the coating occupied by solid particles (e.g., electrochemically active material, binder, conductor, etc.) as compared to the total volume of that coating, measured after the coating has been dried and densified; typically expressed as a percentage but also can be expressed as the inverse of the coating's porosity (i.e., 100% minus the percent porosity of the coating);

specific energy density—the capacity of the electrode, cell or battery, according to the stated conditions (e.g., discharge at 200 mA continuous drain, total input on an interfacial capacity, etc.) divided by the total weight of the entire cell or battery generally expressed in watt-hours/kilogram (Wh/kg) or milliwatt-hours/gram (mWh/g);

theoretical input capacity—the capacity of the electrochemical material(s) in a single electrode or an entire cell based upon the theoretically available electrochemical capacity of the material comprising the electrode/cell; may be calculated by multiplying the weight of each active material in the electrode by the theoretical specific capacity of that active material, with theoretical specific capacity of each active material determined by: [(96,487 ampere-seconds/mole)/(number of grams/mole of active material)]×(number of electrons/mole of active material)/(3600 seconds/hour)×(1000 milliampere hours/ampere-hour); Table 1 lists exemplary theoretical input capacities calculated according to this formula:

TABLE 1

Theoretical Input Capacities for Selected Materials.

| Material | Theoretical Input Capacity (mAh/g) |
| --- | --- |
| Li | 3862 |
| S | 1672 |
| $FeS_2$ | 893.6 |
| $CF_x$ | 864.3 |
| CuO | 673.8 |
| CuS | 560.7 |

TABLE 1-continued

Theoretical Input Capacities for Selected Materials.

| Material | Theoretical Input Capacity (mAh/g) |
| --- | --- |
| $MnO_2$ | 308.3 |
| $FeCuS_2$ | 292.1 | theoretical interfacial input capacity—the capacity of an electrode or an entire cell based on the overall cell discharge reaction mechanism(s) and the total amount of active material contained within the portion of the active material mixture adjacent to active material in the opposite electrode, assuming complete reaction of all of the active material; if only one of the two major surfaces of an electrode strip is adjacent active material in the opposite electrode, only the active material on that side of the electrode—either the material on that side of a solid current collector sheet or that material in half the thickness of an electrode without a solid current collector sheet—is included in the determination of interfacial capacity;

The invention will be better understood with reference to FIG. 1. In FIG. 1, the cell 10 is one embodiment of a FR6 (AA) type cylindrical $LiFeS_2$ battery cell, although the invention should have equal applicability to FR03 (AAA) or other cylindrical cells. The cell 10 has, in one embodiment, a housing that includes a container in the form of can 12 with a closed bottom and an open top end that is closed with a cell cover 14 and a gasket 16. The can 12 has a bead or reduced diameter step near the top end to support the gasket 16 and cover 14. The gasket 16 is compressed between the can 12 and the cover 14 to seal an anode or negative electrode 18, a cathode or positive electrode 20 and electrolyte within the cell 10.

The anode 18, cathode 20 and a separator 26 are spirally wound together into an electrode assembly. The cathode 20 has a metal current collector 22, which extends from the top end of the electrode assembly and is connected to the inner surface of the cover 14 with a contact spring 24. The anode 18 is electrically connected to the inner surface of the can 12 by a metal lead (or tab) 36. The lead 36 is fastened to the anode 18, extends from the bottom of the electrode assembly, and is folded across the bottom and up along the side of the electrode assembly. The lead 36 makes pressure contact with the inner surface of the side wall of the can 12. After the electrode assembly is wound, it can be held together before insertion by tooling in the manufacturing process, or the outer end of material (e.g., separator or polymer film outer wrap 38) can be fastened down, by heat sealing, gluing or taping, for example.

In one embodiment, an insulating cone 46 is located around the peripheral portion of the top of the electrode assembly to prevent the cathode current collector 22 from making contact with the can 12, and contact between the bottom edge of the cathode 20 and the bottom of the can 12 is prevented by the inward-folded extension of the separator 26 and an electrically insulating bottom disc 44 positioned in the bottom of the can 12.

In one embodiment, the cell 10 has a separate positive terminal cover 40, which is held in place by the inwardly crimped top edge of the can 12 and the gasket 16 and has one or more vent apertures (not shown). The can 12 serves as the negative contact terminal. An insulating jacket, such as an adhesive label 48, can be applied to the side wall of the can 12.

In one embodiment, disposed between the peripheral flange of the terminal cover 40 and the cell cover 14 is a positive temperature coefficient (PTC) device 42 that substantially limits the flow of current under abusive electrical conditions. In another embodiment, the cell 10 may also include a pressure relief vent. The cell cover 14 has an aperture comprising an inward projecting central vent well 28 with a vent hole 30 in the bottom of the well 28. The aperture is sealed by a vent ball 32 and a thin-walled thermoplastic bushing 34, which is compressed between the vertical wall of the vent well 28 and the periphery of the vent ball 32. When the cell internal pressure exceeds a predetermined level, the vent ball 32, or both the ball 32 and bushing 34, is forced out of the aperture to release pressurized gases from the cell 10. In other embodiments, the pressure relief vent can be an aperture closed by a rupture membrane, such as disclosed in U.S. Patent Application Publication Nos. 20050244706 and 20080213651, which are incorporated by reference, or a relatively thin area such as a coined groove, that can tear or otherwise break, to form a vent aperture in a portion of the cell, such as a sealing plate or container wall.

In one embodiment, the terminal portion of the electrode lead 36, disposed between the side of the electrode assembly and the side wall of the can, may have a shape prior to insertion of the electrode assembly into the can, preferably non-planar that enhances electrical contact with the side wall of the can and provides a spring-like force to bias the lead against the can side wall. During cell manufacture, the shaped terminal portion of the lead can be deformed, e.g., toward the side of the electrode assembly, to facilitate its insertion into the can, following which the terminal portion of the lead can spring partially back toward its initially non-planar shape, but remain at least partially compressed to apply a force to the inside surface of the side wall of the can, thereby making good physical and electrical contact with the can. Alternatively, this connection, and/or others within the cell, may also be maintained by way of welding.

The cell container is often a metal can with a closed bottom such as the can in FIG. 1. The can material and thickness of the container wall will depend in part of the active materials and electrolyte used in the cell. A common material type is steel. For example, the can may be made of cold rolled steel (CRS), and may be plated with nickel on at least the outside to protect the outside of the can from corrosion. Typically, CRS containers according to the invention can have a wall thickness of approximately between 7 and 10 mils for a FR6 cell, or 6 to 9 mils for a FR03 cell. The type of plating can be varied to provide varying degrees of corrosion resistance, to improve the contact resistance or to provide the desired appearance. The type of steel will depend in part on the manner in which the container is formed. For drawn cans, the steel can be a diffusion annealed, low carbon, aluminum killed, SAE 1006 or equivalent steel, with a grain size of ASTM 9 to 11 and equiaxed to slightly elongated grain shape. Other steels, such as stainless steels, can be used to meet special needs. For example, when the can is in electrical contact with the cathode, a stainless steel may be used for improved resistance to corrosion by the cathode and electrolyte.

The cell cover can be metal. Nickel plated steel may be used, but a stainless steel is often desirable, especially when the closure and cover are in electrical contact with the cathode. The complexity of the cover shape will also be a factor in material selection. The cell cover may have a simple shape, such as a thick, flat disk, or it may have a more complex shape, such as the cover shown in FIG. 1. When the cover has a complex shape like that in FIG. 1, a type 304 soft annealed stainless steel with ASTM 8-9 grain size may be used to provide the desired corrosion resistance and ease of metal forming. Formed covers may also be plated, with nickel for example, or made from stainless steel or other known metals and their alloys.

The terminal cover should have good resistance to corrosion by water in the ambient environment or other corrosives commonly encountered in battery manufacture and use, good electrical conductivity and, when visible on consumer batteries, an attractive appearance. Terminal covers are often made from nickel plated cold rolled steel or steel that is nickel plated after the covers are formed. Where terminals are located over pressure relief vents, the terminal covers generally have one or more holes to facilitate cell venting.

The gasket used to perfect the seal between the can and the closure/terminal cover may be made from any suitable thermoplastic material that provides the desired sealing properties. Material selection is based in part on the electrolyte composition. Examples of suitable materials include polypropylene, polyphenylene sulfide, tetrafluoride-perfluoroalkyl vinylether copolymer, polybutylene terephthalate and combinations thereof. Preferred gasket materials include polypropylene (e.g., PRO-FAX® 6524 from Basell Polyolefins in Wilmington, Del., USA) and polyphenylene sulfide (e.g., XTEL™ XE3035 or XE5030 from Chevron Phillips in The Woodlands, Tex., USA). Small amounts of other polymers, reinforcing inorganic fillers and/or organic compounds may also be added to the base resin of the gasket. Examples of suitable materials can be found in U.S. Patent Publication Nos. 20080226982 and 20050079404, which are incorporated by reference.

The gasket may be coated with a sealant to provide the best seal. Ethylene propylene diene terpolymer (EPDM) is a suitable sealant material, but other suitable materials can be used.

The anode comprises a strip of lithium metal, sometimes referred to as lithium foil. The composition of the lithium can vary, though for battery grade lithium the purity is always high. The lithium can be alloyed with other metals, such as aluminum, to provide the desired cell electrical performance or handling ease, although the amount of lithium in any alloy should nevertheless be maximized and alloys designed for high temperature application (i.e., above the melting point of pure lithium) are not contemplated. Appropriate battery grade lithium-aluminum foil, containing 0.5 weight percent aluminum, is available from Chemetall Foote Corp., Kings Mountain, N.C., USA. An anode consisting essentially of lithium or a lithium alloy (for example, 0.5 wt. % Al and 99+wt. % Li) is preferred, with an emphasis placed on maximizing the amount of active material (i.e., lithium) in any such alloy.

As in the cell in FIG. 1, a separate current collector (i.e., an electrically conductive member, such as a metal foil, on which the anode is welded or coated, or an electrically conductive strip running along substantial portions the length of the anode such that the collector would be spirally wound within the jellyroll) is not needed for the anode, since lithium has a high electrical conductivity. By not utilizing such a current collector, more space is available within the container for other components, such as active materials. If used, an anode current collectors could be made of copper and/or other appropriate high conductivity metals that are stable when exposed to the other interior components of the cell (e.g., electrolyte).

The electrical connection is maintained between each of the electrodes and the opposing external battery terminals, which are proximate to or integrated with the housing. An electrical lead 36 can be made from a thin metal strip connecting the anode or negative electrode to one of the cell terminals (the can in the case of the FR6 cell shown in FIG. 1). This may be accomplished embedding an end of the lead within a portion of the anode or by simply pressing a portion such as an end of the lead onto the surface of the lithium foil. The lithium or lithium alloy has adhesive properties and generally at least a slight, sufficient pressure or contact between the lead and electrode will weld the components together. The negative electrode may be provided with a lead prior to winding into a jellyroll configuration. The lead may also be connected via appropriate welds.

The metal strip comprising the lead 36 is often made from nickel or nickel plated steel with sufficiently low resistance (e.g., generally less than 15 mΩ/cm and preferably less than 4.5 mΩ/cm) in order to allow sufficient transfer of electrical current through the lead. Examples of suitable negative electrode lead materials include, but are not limited to, copper, copper alloys, for example copper alloy 7025 (a copper, nickel alloy comprising about 3% nickel, about 0.65% silicon, and about 0.15% magnesium, with the balance being copper and minor impurities); and copper alloy 110; and stainless steel. Lead materials should be chosen so that the composition is stable within the electrochemical cell including the nonaqueous electrolyte.

The cathode is in the form of a strip that comprises a current collector and a mixture that includes one or more electrochemically active materials, usually in particulate form. Iron disulfide ($FeS_2$) is primary active material. The cathode can also contain small amounts of one or more additional active materials, depending on the desired cell electrical and discharge characteristics. The additional active cathode material may be any suitable active cathode material. Examples include metal oxides, $Bi_2O_3$, $C_2F$, $CF_x$, $(CF)_n$, $CoS_2$, CuO, CuS, FeS, $FeCuS_2$, $MnO_2$, $Pb_2Bi_2O_5$ and S. Preferably, the active material for a $Li/FeS_2$ cell cathode comprises at least about 95 weight percent $FeS_2$, and most preferably $FeS_2$ is the sole active cathode material. Pyrite having a purity level of at least 95 weight percent $FeS_2$ is available from Washington Mills, North Grafton, Mass., USA; Chemetall GmbH, Vienna, Austria; and Kyanite Mining Corp., Dillwyn, Va., USA. Note that the discussion of "purity" of $FeS_2$ acknowledges that pyrite is a specific and preferred mineral form of $FeS_2$. However, pyrite often times has small levels of impurities (typically silicon oxides) and, because only the $FeS_2$ is electrochemically active in pyrite, references to percent purity of $FeS_2$ are made with respect to the total amount of pyrite, usually on a weight percentage basis. Thus, pyrite and $FeS_2$ may not be synonymous when read in proper context. A more comprehensive description of the cathode, its formulation and a manner of manufacturing the cathode is provided below.

The cathode mixture is coated onto one or both sides of a thin metal strip which serves as the cathode current collector. Aluminum is a commonly used material, although titanium, copper, steel, other metallic foils and alloys thereof are also possible. The current collector may extend beyond the portion of the cathode containing the cathode mixture. This extending portion of the current collector can provide a convenient area for making contact with the electrical lead connected to the positive terminal, preferably via a spring or pressure contact that obviates the need for a lead and/or welded contacts. It is desirable to keep the volume of the extending portion of the current collector to a minimum to make as much of the internal volume of the cell available for active materials and electrolyte. Examples of typical coating configurations for the cathode can be found in U.S. Patent Publication No. 20080026293, which is incorporated by reference.

The cathode is electrically connected to the positive terminal of the cell. This may be accomplished with an electrical lead, often in the form of a thin metal strip or a spring, as shown in FIG. 1, although welded connections are also possible. If used, this lead can be made from nickel plated stainless steel or other appropriate materials. In the event an optional current limiting device, such as a standard PTC, is utilized as a safety mechanism to prevent runaway discharge/heating of the cell, a suitable PTC is sold by Tyco Electronics in Menlo Park, Calif., USA. A typical, standard PTC device generally comprises a resistance of approximately 36 mΩ/cm. Other alternatives, including lower resistance devices of approximately 18 mΩ/cm, are also available. Alternative current limiting devices can be found in U.S. Publication Nos. 20070275298 and 20080254343, which are incorporated by reference.

The separator is a thin microporous membrane that is ion-permeable and electrically nonconductive. It is capable of holding at least some electrolyte within the pores of the separator. The separator is disposed between adjacent surfaces of the anode and cathode to electrically insulate the electrodes from each other. Portions of the separator may also insulate other components in electrical contact with the cell terminals to prevent internal short circuits. Edges of the separator often extend beyond the edges of at least one electrode to insure that the anode and cathode do not make electrical contact even if they are not perfectly aligned with each other. However, it is desirable to minimize the amount of separator extending beyond the electrodes.

To provide good high power discharge performance, it is desirable that the separator have the characteristics (pores with a smallest dimension of at least about 0.005 μm and a largest dimension of no more than about 5 μm across, a porosity in the range of about 30 to 70 percent, an area specific resistance of from 2 to 15 ohm-$cm^2$ and a tortuosity less than 2.5) disclosed in U.S. Pat. No. 5,290,414, issued Mar. 1, 1994, and hereby incorporated by reference. Other desirable separator properties are described in U.S. Patent Publication No. 20080076022, which is hereby incorporated by reference.

Separators are often made of polypropylene, polyethylene or both. The separator can be a single layer of biaxially oriented microporous membrane, or two or more layers can be laminated together to provide the desired tensile strengths in orthogonal directions. A single layer is preferred to minimize the cost. The membrane should have a thickness between 16 and 25 microns, depending upon the cathode formulation and constraints on container strength disclosed herein. Suitable separators are available from Tonen Chemical Corp., available from EXXON Mobile Chemical Co., Macedonia, N.Y., USA and Entek Membranes in Lebanon, Oreg., USA.

A nonaqueous electrolyte, containing water only in very small quantities as a contaminant (e.g., no more than about 500 parts per million by weight, depending on the electrolyte salt being used), is used in the battery cell of the invention. The electrolyte contains one or more lithium-based electrolyte salts dissociated in one or more organic solvents. Suitable salts include one or more of the following: lithium bromide, lithium perchlorate, lithium hexafluorophosphate, potassium hexafluorophosphate, lithium hexafluoroarsenate, lithium trifluoromethanesulfonate and lithium iodide, although the salt preferably includes $I^-$ (e.g., by dissociation of LiI in the solvent blend). Suitable organic solvents include one or more of the following: methyl formate, γ-butyrolactone, sulfolane, acetonitrile, 3,5-dimethylisoxazole, n,n-dimethyl formamide and ethers, although at least 50 volume percent of the total solvents must be ether because its low viscosity and wetting capability appear to positively influence the thicker electrode constructions described below. Preferred ethers can be acyclic (e.g., 1,2-dimethoxyethane, 1,2-diethoxyethane, di(methoxyethyl)ether, triglyme, tetraglyme and diethyl ether) and/or cyclic (e.g., 1,3-dioxolane, tetrahydrofuran, 2-methyl tetrahydrofuran and 3-methyl-2-oxazolidinone). 1,3-dioxolane and 1,2-dimethoxyethane are the preferred solvents, while lithium iodide is the preferred salt, although it may be used in combination with lithium triflate, lithium imide or lithium perchlorate. Additives that result in the creation of I$^-$ dissociated in the solvent blend may also be used.

The anode, cathode and separator strips are combined together in an electrode assembly. The electrode assembly may be a spirally wound design, such as that shown in FIG. 1, made by winding alternating strips of cathode, separator, anode and separator around a mandrel, which is extracted from the electrode assembly when winding is complete. At least one layer of separator and/or at least one layer of electrically insulating film (e.g., polypropylene) is generally wrapped around the outside of the electrode assembly. This serves a number of purposes: it helps hold the assembly together and may be used to adjust the width or diameter of the assembly to the desired dimension. The outermost end of the separator or other outer film layer may be held down with a piece of adhesive tape or by heat sealing. The anode can be the outermost electrode, as shown in FIG. 1, or the cathode can be the outermost electrode. Either electrode can be in electrical contact with the cell container, but internal short circuits between the outmost electrode and the side wall of the container can be avoided by matching the polarity of the outermost wind of the electrode assembly to that of the can.

The cell can be closed and sealed using any suitable process. Such processes may include, but are not limited to, crimping, redrawing, colleting and combinations thereof. For example, for the cell in FIG. 1, a bead is formed in the can after the electrodes and insulator cone are inserted, and the gasket and cover assembly (including the cell cover, contact spring and vent bushing) are placed in the open end of the can. The cell is supported at the bead while the gasket and cover assembly are pushed downward against the bead. The diameter of the top of the can above the bead is reduced with a segmented collet to hold the gasket and cover assembly in place in the cell. After electrolyte is dispensed into the cell through the apertures in the vent bushing and cover, a vent ball is inserted into the bushing to seal the aperture in the cell cover. A PTC device and a terminal cover are placed onto the cell over the cell cover, and the top edge of the can is bent inward with a crimping die to hold and retain the gasket, cover assembly, PTC device and terminal cover and complete the sealing of the open end of the can by the gasket.

With respect to the cathode, the cathode is coated onto a metallic foil current collector, typically an aluminum foil with a thickness between about 16 and 20 μm. The cathode is formed as a mixture which contains a number of materials that must be carefully selected to balance the processability, conductivity and overall efficiency of the coating. These components are mixed into a slurry in the presence of a solvent, such as trichloroethylene, and then coated onto the current collector. The resulting coating is preferably dried and densified after coating, and it consists primarily of iron disulfide (and its impurities); a binder to hold the particulate materials together and adhere the mixture to the current collector; one or more conductive materials such as metal, graphite and carbon black powders to provide improved electrical conductivity to the mixture; and various processing or rheological aids, such as fumed silica and/or an overbased calcium sulfonate complex. A preferred cathode formulation is disclosed in U.S. Patent Publication 20090104520, which is incorporated by reference. Additionally, it has been determined that lithium-irondisulfide batteries intended for high rate applications inure benefits by providing an excess of theoretical interfacial input capacity in the cathode as compared to the theoretical interfacial input capacity of the anode associated therewith, as described in U.S. Pat. No. 7,157,185 which is incorporated by reference herein. Thus, in one embodiment, cells of the invention have an interfacial anode to cathode input ratio of less than 1.00.

The positive electrodes can be formed by coating (e.g., roll coating) a slurry of active material mixture materials in a highly volatile organic solvent (e.g., trichloroethylene) onto both sides of a sheet of aluminum foil, drying the coating to remove the solvent, calendering the coated foil to compact the coating, slitting the coated foil to the desired width and cut strips of the slit positive electrode material to the desired length. Coating thicknesses of about 100 μm are common, and the positive electrode 118 has an overall thickness of less than about 500 μm in thickness and, more preferably, between 150-380 μm, inclusive of the thickness of the foil and the coating.

Thus, when 20 micron foil is coated on both sides to the preferred thickness of 100 μm, the positive electrode has .a total thickness, inclusive of the thickness of the foil, of 220 μm. Other thicknesses for the positive electrode contemplated by certain embodiments of this invention, inclusive of the foil and the final coating, are 380 μm and 500 μ.

The following are representative materials utilized in the preferred cathode formulation. between 94 wt. % to 99 wt. % pyrite, 0.1-3.0 wt. % conductor, about 0.1-3.0 wt. % binder, and about 0-1.0 wt. % processing aids. It is more desirable to have a cathode mixture with about 95-98 wt. % pyrite, about 0.5-2.0 wt. % conductor, about 0.5-2.0 wt. % binder, and about 0.1-0.5 wt. % processing aids. It is even more desirable to have a cathode mixture with about 96-97 wt. % pyrite, about 1.0-2.0 wt. % conductor, about 1.0-1.5 wt. % binder, and about 0.3-0.5 wt. % processing aids. The conductor may comprise PureBlack™ (carbon black) 205-110 from Superior Graphite Chicago, Ill. and/or MX15 from Timcal Westlake, Ohio. The binder/processing aids may comprise a polymeric binder comprising a styrene-ethylene/butylenes-styrene (SEBS) block copolymer, such as g1651 from Kraton Polymers Houston, Tex., and EFKA® 6950 overbased calcium sulfonate complex previously available from Ciba, Heerenveen, Netherlands or AEROSIL® 200 fumed silica from Evonik Industries AG, Essen, Germany.

It is also desirable to use cathode materials with small particle sizes to minimize the risk of puncturing the separator. For example, FeS$_2$ can be sieved, at least through a 230 mesh (62 μm) screen or smaller. More preferably, the FeS$_2$ may be media milled to have an average d50 particle size than 10 μm or less or processed, as described in U.S. Patent Publication No. 20050233214, which is incorporated by reference herein.

The cathode mixture is applied to the foil collector using any number of suitable processes, such as three roll reverse, comma coating or slot die coating. After or concurrent with drying to remove any unwanted solvents, the resulting cathode strip is densified via calendering or the like to further compact the entire positive electrode. In light of the fact that this strip will then be spirally wound with separator and a similarly (but not necessarily identically) sized anode strip to form a jellyroll electrode assembly, this densification maximizes loading of electrochemical material in the jellyroll electrode assembly. Particular advantages have been demonstrated in one embodiment of the invention when the cathode loading exceeds at least 28 mg of mix/cm$^2$ on one facing (i.e., one side) of the current collector, more preferably exceeding 30 mg/cm² and most preferably exceeding 32 mg/cm², as illustrated in the examples below.

However, the cathode cannot be over-densified as some internal cathode voids are needed to allow for expansion of the iron disulfide during discharge and wetting of the iron disulfide by the organic electrolyte. More practically, there are also operational limits as to the amount of force that can be applied to compact the coatings to high densities, and the stress on the current collector created by such forces can result in unwanted stretching and/or actual de-lamination of the coating. Therefore, it is preferable that the solids packing percentage in the final densified cathode must be sufficient to allow for the electrochemical reaction to proceed. Preferably, the final solids packing must be between about 58% and 70%.

Improvements to the electrochemical cell can be measured based on the electrochemical cell performance under a variety of different high rate tests. Ultimately, the best performing, prior art FR6 cell known to the inventor had a DSC performance of about 330 minutes. This prior art cell also had approximately 22 mg of cathode mix, including 92 wt. % of pyrite, per cm² on a single side of the two-sided cathode current collector and 220 cm² of total interfacial surface area between the electrodes, resulting in approximately 18 mWh/cm² of interfacial surface area for the DSC test. Other known FR6 cells typically varied between about 18 mg to 25 mg of mix/cm² of a single side of the cathode (based on between 80 to 88 wt. % pyrite) and 200 to 220 cm² of interfacial surface area; however, these cells did markedly worse on the DSC test, typically yielding no better than about 260 to 285 minutes and about 15 to 17 mWh/cm². In extreme cases, cells were observed to have loading 28 mg or more of mix/cm², but these cells performed the worst of all known prior art on the DSC test (e.g., usually less than 250 minutes, sometimes even providing no service), possibly explained by their choice of electrolyte, solids packing and/or relatively low weight percentage of pyrite. In every instance, all known prior art FR6 cells had an anode consisting of at least 99.5 wt. % lithium with a thickness less than about 165 microns and a cathode coating having less than 93 wt. % of pyrite. Similarly, all of these cells show less than 20% decrease in the R10 resistance during the DSC at two thirds (i.e., 66%) depth of discharge. Notably, two thirds depth of discharge is within the range where the maximum decrease in this resistance is observed.

This data reflects the belief in the art is that the interfacial surface area between the electrodes should be maximized to optimize the cell's performance on high rate applications such as the DSC test. In a fixed space, such as an FR6 can, the thickness of the electrodes impacts the amount of interfacial surface area. Thicker electrodes will result in fewer winds within the jellyroll and, by extension, an expectation of reduced interfacial surface area and reduced DSC performance. Additional processing and manufacturing difficulties may also occur; for example, the cathode mix formulation, coating and densification operations will all be impacted as the cathode thickness increases, as will the jellyroll winding when the electrode thickness changes. Consequently, it had been considered desirable to maintain a jellyroll interfacial area of about 200 to 220 cm² in an FR6 cell, which corresponds to an anode thickness between 140 and 165 microns, a separator thickness between 16 to 25 microns and a cathode thickness between 180 and 220 microns (inclusive of the current collector).

The inventor has now discovered, quite unexpectedly, that increasing the thickness of the anode, in combination with increasing the weight percent pyrite in the mix and/or the loading of mix on the current collector while maintaining the coating solids packing within a specific range, yields significantly improved high rate performance with little to no impact on the other performance characteristics of the cell, notwithstanding the fact that these changes necessarily reduces the overall interfacial surface area in the electrode assembly. In particular, an interfacial surface area of less than 200 cm² is contemplated, which corresponds to an anode of thickness of at least 175 microns in an FR6 cell. The final solids packing of the cathode must be between 58% to 70%, while the cathode coating have at least 24 mg, and more preferably in excess of 28 mg, of mix per single side of current collector and/or at least 91 wt. % of pyrite, and more preferably in excess of 93 wt. %. In each instance, an electrolyte having at least 50% ethers and substantially no carbonates is needed. Preferably, the electrolyte solution will have I⁻ as one of its dissociated electrolytic salts or as an electrolyte additive. I⁻ can be formed through the use of the lithium-based salt lithium iodide being dissolved in a solvent blend preferably having at least 90 vol. % of one or more ethers (based on the total volume of the solvents). However, carbonates cannot normally be used in the blend. While not intending to be bound by any specific theory, it is believed carbonates possess relatively high viscosity, wetting properties to interact beneficially with the preferred cathode described above.

The amount of $FeS_2$ in the cathode coating can either be determined by analyzing the mixture prior to fabrication of the battery or by determining the iron content post-formulation and correlating the detected level of iron to the weight percentage of pyrite in the cathode. The method of testing for iron content post-fabrication can be conducted by dissolving a known amount (in terms of mass and volume/area) of cathode in acid, then testing for the total amount of iron in that dissolved sample using common quantitative analytical techniques, such as inductively coupled plasma atomic emission spectroscopy or atomic absorption spectroscopy. Testing of known coated cathode formulations according to this method have verified that the total amount of iron is representative of $FeS_2$ in the cell (particularly to the extent that is desirable to maximize the purity of $FeS_2$ in the cathode coating). It may also be possible to determine cathode density using a pycnometer, although certain binders may experience volumetric changes when exposed to the internal environment of a lithium-iron disulfide cell such that the density established by such methods may need to be adjusted further in order to arrive at the cathode dry mix density.

Notably, testing for the quantity of aluminum in the sample will allow for calculation of the thickness of the current collector (when the collector is aluminum) in a similar manner (e.g., ICP-AES or AA spectroscopy). Other similar analytical techniques may be employed to test for binders, processing aids and the like, depending upon the atomic and/or molecular composition of those components, and analysis of the anode and/or separator is possible using similar analytical and quantitative/qualitative techniques.

To the extent that the weight per unit area of the cathode is to be determined from a post-fabrication, the cathode should be rinsed to remove any electrolyte remnants and thoroughly dried to insure solvent does not contribute to the measure weight. The weight contribution from the current collector may then be subtracted from this measurement through the appropriate empirical analysis of the collector described above.

R10 resistance, as used throughout this specification, is a specific cell resistance measurement technique using a current interrupt method. The R10 resistance primarily reflects the ohmic resistance of the cell (i.e., the resistance to electrical current flow that follows Ohm's law).

R10 resistance can be measured during any service test, although as used herein, the R10 resistance is measured during the Digital Still Camera Test. Specifically, a double pulse technique is employed with the measured voltage and the current data being first observed at the $10^{th}$ high power pulse step in each cycle of the DSC test (e.g., the $10^{th}$ 1500 mW pulse of an FR6 DSC Test) and also at the 100 millisecond interval of the corresponding low power step of that same cycle (e.g., the 650 W pulse). Similar measurements are recorded on the $10^{th}$ pulse of every cycle for the entire DSC Test. In turn, the first measurement (i.e., taken when approximately 5 minutes have elapsed in the test) can be compared to another measurement at predetermined point during the discharge regime. As used throughout the specification, the R10 resistance of the first cycle will compared to a second measurement at approximately the two thirds depth of discharge point during the DSC Test.

The precise calculation for the two comparative measurements (i.e., the first interval being the $10^{th}$ pulse of the first cycle and the second interval being the $10^{th}$ pulse of the cycle closest to the two thirds depth of discharge point) is as follows, with $V_{hp}$ and $I_{hp}$ being the voltage and current of the high power step at the end of the $10^{th}$ pulse of the discharge cycle (e.g., 5 minutes or 66% depth of discharge) and $V_{lp}$ and $I_{lp}$ being the voltage and current 100 milliseconds into the low power pulse immediately following the aforementioned high power step, respectively.

$$R10_{interval} = \left| \frac{V_{hp} - V_{lp(t=100\ ms)}}{I_{hp} - I_{lp(t=100\ ms)}} \right|$$

To the extent that data may not be recorded precisely at the two thirds depth of discharge point, it is possible to interpolate between the two closest data points in order to accurately and effectively determine the necessary value. It should also be apparent that the DSC Test must be run to its completion in order to definitively establish the comparison points inherent to the R10 resistance measurements contemplated herein. Also, R10 resistance for FR03 cells (or any other size) can be determined accordingly using the same method for FR6, but with the high and low power pulses adjusted for AAA size according to ANSI C18.3M, Part 1 2005 standard (or the appropriate standard).

The entirety of the above description is particularly relevant to FR6 and FR03 cells. However, the invention might also be adapted to other cylindrical cell sizes where the sidewall height exceeds the diameter of the container, cells with other cathode coating schemes and/or seal and/or pressure relief vent designs.

Features of the invention and its advantages will be further appreciated by those practicing the invention. Furthermore, certain embodiments of the components and the performance of the cell assembled as described will be realized. It will be understood by those who practice the invention and those skilled in the art that various modifications and improvements may be made to the invention without departing from the teachings of the disclosed concepts. The scope of protection afforded is to be determined by the claims and by the breadth of interpretation allowed by law.

The invention will now be described with reference to the following non-limiting examples.

EXAMPLE

A series of FR6 cells were constructed as shown in Tables 1a and 1b below. For Lots 1-8, an identical cell housing, electrolyte solution and separator thickness were used, such that only the thickness of the lithium, solids packing and loading of the cathode and separator manufacturer were appreciably altered. Lots 1 and 3 represent comparative examples created by the inventor (i.e., these cells do not represent prior art examples), while lot 2 represents the best performing, prior art FR6 cell known to the inventor (also referenced above). Lots 4, 5, 6, 7 and 8 are various embodiments of the invention. In this manner, direct comparisons can be made regarding the effects of anode thickness and cathode formulation for Lots 1-8.

Additional comparative examples are shown, Lots A, B and C. Lots A-C are other FR6 cells from the prior art. While many of the components, including the cell housing materials and anodes, for Lots A-C are believed to be substantially similar to those used in Lots 1-8, Lots A-C have different/unknown electrolyte formulations (possibly based on lithium triflate, lithium imide and/or lithium perchlorate salts dissolved in all ether solvents), thicker separators and different cathode formulations. In this manner, further comparisons on these points can be made between Lots 4-8 and A and B.

TABLE 1a

| | Lot | | | | | |
|---|---|---|---|---|---|---|
| | 1 | 2 | 3 | A | B | C |
| Pyrite wt. % of total mix | 96.5 | 92 | 85.7 | ~80 to 85 | ~80 to 88 | ~85 to 88 |
| Cathode loading (mg mix/cm$^2$) | 14.6 | 21.8 | 31.9 | ~20 to 22 | ~22 to 24 | ~22 to 24 |
| Cathode solids packing % | 70 | 64 | 70 | ~63 to 67 | ~60 to 69 | ~58 to 64 |
| Li thickness (μm) | 102 | 152 | 203 | ~150 | ~145 | ~155 |
| Lithium width (cm) | 3.899 | 3.899 | 3.899 | ~3.900 | ~4.000 | ~3.990 |
| Interfacial area (cm$^2$) | 327 | 219 | 175 | ~215 | ~210 | ~201 |
| Electrolyte LiI (molality) | 0.75 | 0.75 | 0.75 | N/A | N/A | N/A |
| Separator thickness (μm) | 20 | 20 | 20 | 25 | 25 | 25 |

TABLE 1b

| | Lot | | | | |
|---|---|---|---|---|---|
| | 4 | 5 | 6 | 7 | 8 |
| Pyrite wt. % of total mix | 96.4 | 96.4 | 91 | 96.5 | 96.5 |
| Cathode loading (mg mix/cm$^2$) | 28.3 | 28.3 | 30.0 | 33.6 | 33.6 |
| Cathode solids packing % | 58 | 70 | 64 | 60 | 60 |
| Li thickness (μm) | 203 | 203 | 203 | 229 | 254 |
| Lithium width (cm) | 3.899 | 3.899 | 3.899 | 3.899 | 3.899 |
| Interfacial area (cm$^2$) | 182 | 195 | 178 | 157 | 145 |
| Interfacial anode to cathode input ratio | 0.90 | 0.90 | 0.90 | 0.85 | 0.85 |
| Electrolyte LiI (molality) | 0.75 | 0.75 | 0.75 | 0.75 | 0.75 |
| Separator thickness (μm) | 20 | 20 | 20 | 20 | 20 |

All cells were constructed with a ratio of theoretical interfacial input capacity of the anode to theoretical interfacial input ratio of the cathode that is less than 1.00, thereby allowing for fair comparisons on high rate tests. In turn, these cells were tested on the Digital Still Camera test while their R10 resistance was monitored. Results for these tests are shown in Tables 2a and 2b.

TABLE 2a

| | Lot | | | | | |
|---|---|---|---|---|---|---|
| | 1 | 2 | 3 | A | B | C |
| DSC performance (minutes) | 328 | 333 | 303 | 275 | 264 | 285 |
| Energy on DSC test (mWh) | 3866 | 3922 | 3565 | 3239 | 3109 | 3356 |
| Energy per unit interfacial area on DSC test (mWh/cm$^2$) | 11.8 | 17.9 | 20.4 | 15.1 | 14.8 | 16.7 |
| $R10_{1st}$ ($\Omega$) | 0.102 | 0.103 | 0.097 | 0.066 | 0.146 | 0.118 |
| DSC service at ⅔ (min) | 219 | 222 | 202 | 183 | 176 | 203 |
| $R10_{2nd}$ ($\Omega$) at ⅔ DOD on DSC | 0.093 | 0.091 | 0.082 | 0.055 | 0.136 | 0.110 |
| % of decrease | 9% | 12% | 16% | 17% | 7% | 7% |

TABLE 2bB

| | Lot | | | | |
|---|---|---|---|---|---|
| | 4 | 5 | 6 | 7 | 8 |
| DSC performance (minutes) | 374 | 389 | 347 | 363 | 340 |
| Energy (mWh) on DSC test | 4405 | 4581 | 4084 | 4275 | 3998 |
| Energy per unit interfacial area on DSC test (mWh/cm$^2$) | 24.2 | 23.6 | 22.9 | 27.2 | 27.7 |
| $R10_{1st}$ ($\Omega$) | 0.113 | 0.114 | 0.109 | 0.156 | 0.164 |
| DSC service at ⅔ (min) | 249 | 259 | 231 | 242 | 226 |
| $R10_{2nd}$ ($\Omega$) at ⅔ DOD on DSC | 0.076 | 0.073 | 0.081 | 0.083 | 0.081 |
| % of decrease | 33% | 36% | 26% | 47% | 50% |

With respect to the foregoing results, it should be noted that high interfacial surface area design in Lot 1 is still inferior to Lots 4-8 (in terms of DSC test results), mostly like because of Lot 1 does not utilize the requisite cathode loading. Similarly, although Lot 3 possesses a relatively high cathode loading and low interfacial surface area, Lot 3 is inferior to Lots 4-8 due to its cathode mix failing to have enough weight percent of pyrite. In place of pyrite in Lot 3, graphite conductor attributed approximately 12 wt. % of this particular formulation; however, notwithstanding the expectation of improved cathode efficiency expected from extra conductor, Lot 3 failed to approach the high rate results of Lots 4-8. In this manner, it can be seen that only cells possessing the appropriate combination of lithium thickness, cathode final solids packing, weight percent pyrite in the cathode mix and cathode loading achieve improved high rate performance characteristics.

In view of the foregoing, an electrochemical cell comprising any combination of the following features is contemplated:

an R6 sized container having a height no greater than about 50.5 mm and a diameter no greater than about 14.5 mm;

a jellyroll electrode assembly having less than 200 cm$^2$ of interfacial area between an anode consisting essentially of lithium or lithium-based alloy and a cathode comprising a mix coated onto a metallic foil current collector, wherein the mix has at least 91 wt. % pyrite and a final solids packing between 58% to 70%;

an electrolyte consisting essentially of one or more electrolytic salts dissociated in one or more solvents comprising at least 50 vol. % of one or more ethers based on total volume of the solvents, said one or more solvents not including any carbonate-based solvents;

wherein the cell has an energy per unit of interfacial area in excess of 21 mWh/cm$^2$ on the Digital Still Camera Test;

wherein energy per unit of interfacial area in excess of 23 mWh/cm$^2$ on the Digitial Still Camera Test;

wherein the cell has an energy per unit of interfacial area in excess of 27 mWh/cm$^2$ on the Digital Still Camera Test;

wherein the interfacial area is less than 185 cm$^2$;

wherein the interfacial area is less than 175 cm$^2$;

wherein the mix has at least 93 wt. % of pyrite;

wherein the mix has at least 96 wt. % of pyrite;

wherein the one or more solvents comprise greater than 90 vol. % of one or more ethers; and/or wherein the one or more electrolytic salt, when dissociated in the one or more solvents, includes I$^-$.

Additionally, an electrochemical cell comprising any combination of the following features is contemplated:

a container;

a jellyroll electrode assembly having a separator with a thickness of 25 microns or less disposed between an anode consisting essentially of lithium or lithium-based alloy with a thickness of at least 200 microns and a cathode comprising a mix coated onto a metallic foil current collector, said mix comprising a final solids packing is between 58% to 70% and having a loading of at least 28 mg of mix/cm$^2$ on each side of the two sides of the current collector (i.e., 56 mg when both sides of a two sided collector are considered);

an electrolyte including at least one lithium-based salt and one or more solvents having at least 50 vol. % of one or more ethers, based on total volume of the solvents;
wherein the cell experiences a comparative drop of R10 resistance in excess of 20% at about 66% depth of discharge during the Digital Still Camera Test;
wherein the drop of R10 resistance is in excess of 30%;
wherein the drop of R10 resistance is in excess of 45%;
wherein the thickness of lithium is at least 225 microns;
wherein the thickness of the lithium is at least 250 microns;
wherein the thickness of the separator is greater than 16 microns;
wherein the mix has a loading of at least 30 mg/cm$^2$;
wherein the one or more solvents have greater than 90 vol. % of one or more ethers;
wherein the one or more solvents do not contain any carbonates; and/or
wherein the electrolyte further comprises I$^-$ dissociated in the one or more solvents.

Finally, an electrochemical cell comprising any combination of the following features is contemplated:
a container;
a jellyroll electrode assembly having: i) a separator with a thickness between 16 and 25 microns, ii) an anode consisting essentially of lithium or lithium-based alloy with a thickness of at least 175 microns, and iii) a cathode comprising a mix with at least 91 wt. % pyrite coated onto a metallic foil current collector, said mix having a final solids packing between 58% to 70% and a loading of at least 24 mg of mix/cm$^2$ on each side of the two sides of the current collector;
an electrolyte comprising one lithium-based salt and one or more solvents, said one or more solvents consisting of at least 50 vol. % of one or more ethers based on total volume of the solvents;
wherein the jellyroll electrode assembly has a ratio of theoretical interfacial input capacity of the anode to theoretical interfacial input ratio of the cathode that is less than 1.00;
wherein the jellyroll electrode assembly has a ratio that is less than or equal to 0.90;
wherein the jellyroll electrode assembly has a ratio that is less than or equal to 0.85;
wherein the thickness of the anode is at least 200 microns, the mix comprises at least 94 wt. % pyrite and the mix has a loading at least 28 mg/cm$^2$;
wherein the thickness of the anode is at least 225 microns, the mix comprises at least 96 wt. % pyrite and the mix has a loading of at least 30 mg/cm$^2$;
wherein the cell has at least one during the Digital Still Camera test selected from the group consisting of: i) a comparative drop of R10 resistance in excess of 20% at about 66% depth of discharge, and ii) an energy per unit of interfacial area in excess of 21 mWh/cm$^2$;
wherein the cell has at least one during the Digital Still Camera test selected from the group consisting of: i) a comparative drop of R10 resistance in excess of 30% at about 66% depth of discharge, and ii) an energy per unit of interfacial area in excess of 23 mWh/cm$^2$;
wherein the one or more solvents do not contain any carbonates and consist of greater than 90 vol. % of one or more ethers; and/or
wherein the electrolyte further comprises I$^-$ dissociated in the one or more solvents.

What is claimed:
1. An electrochemical cell comprising:
a AA-sized cylindrical container having an external height of about 50.5 mm and an external diameter of about 14.5 mm;
a jellyroll electrode assembly having: i) a separator with a thickness between 16 and 25 microns, ii) an anode consisting essentially of lithium or lithium-based alloy with a thickness of at least 225 microns, iii) a cathode comprising a mix with at least 91 wt. % pyrite coated onto a metallic foil current collector, said mix having a final solids packing between 58% to 70%, a loading of at least 28 mg of mix/cm$^2$ on each side of the current collector and a thickness, inclusive of the current collector and the mix coated thereon, between 220 and 500 microns, and iv) an interfacial surface area of less than 175 cm$^2$; and
an electrolyte comprising one lithium-based salt and one or more solvents, said one or more solvents consisting of at least 50 vol. % of one or more ethers based on total volume of the solvents.

2. An electrochemical cell according to claim 1, wherein the jellyroll electrode assembly has a ratio of theoretical interfacial input capacity of the anode to the theoretical input capacity of the cathode that is between 1.00 and 0.85.

3. An electrochemical cell according to claim 1, wherein the jellyroll electrode assembly has a ratio of theoretical interfacial input capacity of the anode to theoretical interfacial input ratio of the cathode that is less than or equal to 0.90.

4. An electrochemical cell according to claim 1, wherein the jellyroll electrode assembly has a ratio of theoretical interfacial input capacity of the anode to theoretical interfacial input ratio of the cathode that is less than or equal to 0.85.

5. An electrochemical cell according to claim 1, wherein the mix comprises at least 94 wt. % pyrite.

6. An electrochemical cell according to claim 1, wherein the mix comprises at least 96 wt. % pyrite and the mix has a loading of at least 30 mg/cm$^2$.

7. An electrochemical cell according to claim 1, wherein the cell has at least one during the Digital Still Camera test selected from the group consisting of: i) a comparative drop of R10 resistance in excess of 20% at about 66% depth of discharge, and ii) an energy per unit of interfacial area in excess of 21 mWh/cm$^2$.

8. An electrochemical cell according to claim 1, wherein the cell has at least one during the Digital Still Camera test selected from the group consisting of: i) a comparative drop of R10 resistance in excess of 30% at about 66% depth of discharge, and ii) an energy per unit of interfacial area in excess of 23 mWh/cm$^2$.

9. An electrochemical cell according to claim 1, wherein the one or more solvents do not contain any carbonates and consist of greater than 90 vol. % of one or more ethers.

10. An electrochemical cell according to claim 1, wherein the electrolyte further comprises I$^-$ dissociated in the one or more solvents.

11. An electrochemical cell according to claim 1, wherein the thickness of the cathode is about 220 microns.

12. An electrochemical cell according to claim 1, wherein the thickness of the cathode is between 380 and 500 microns.

13. An electrochemical cell according to claim 1, wherein the thickness of the cathode is between 220 and 380 microns.

14. An electrochemical cell according to claim 1, wherein the thickness of the cathode is between 220 and 380 microns.

15. An electrochemical cell comprising:
a AA-sized cylindrical container having an external height of about 50.5 mm and an external diameter of about 14.5 mm;

a jellyroll electrode assembly having: i) a separator with a thickness between 16 and 25 microns, ii) an anode consisting essentially of lithium or lithium-based alloy with a thickness greater than 200 microns, iii) a cathode comprising a mix with at least 91 wt. % pyrite coated onto a metallic foil current collector, said mix having a final solids packing between 58% to 70% and a loading of at least 28 mg of mix/cm$^2$ on each side of the current collector, iv) an interfacial surface area of less than 185 cm$^2$, and v) a ratio of theoretical interfacial input capacity of the anode to theoretical interfacial input ratio of the cathode that is between 0.85 and 1.00; and an electrolyte comprising one lithium-based salt and one or more solvents, said one or more solvents consisting of at least 50 vol. % of one or more ethers based on total volume of the solvents.

16. An electrochemical cell according to claim 15, wherein the jellyroll electrode assembly has a ratio of theoretical interfacial input capacity of the anode to theoretical interfacial input ratio of the cathode that is less than or equal to 0.90.

17. An electrochemical cell according to claim 15, wherein the mix comprises at least 94 wt. % pyrite.

18. An electrochemical cell according to claim 15, wherein the mix comprises at least 96 wt. % pyrite and the mix has a loading of at least 30 mg/cm$^2$.

19. An electrochemical cell according to claim 15, wherein the cell has at least one during the Digital Still Camera test selected from the group consisting of: i) a comparative drop of R10 resistance in excess of 20% at about 66% depth of discharge, and ii) an energy per unit of interfacial area in excess of 21 mWh/cm$^2$.

20. An electrochemical cell according to claim 15, wherein the cell has at least one during the Digital Still Camera test selected from the group consisting of: i) a comparative drop of R10 resistance in excess of 30% at about 66% depth of discharge, and ii) an energy per unit of interfacial area in excess of 23 mWh/cm$^2$.

21. An electrochemical cell according to claim 15, wherein the one or more solvents do not contain any carbonates and consist of greater than 90 vol. % of one or more ethers.

22. An electrochemical cell according to claim 15, wherein the electrolyte further comprises I$^-$ dissociated in the one or more solvents.

* * * * *